United States Patent
Martens

[19]

[11] Patent Number: 5,863,205
[45] Date of Patent: Jan. 26, 1999

[54] LEARNING CLOCK FEATURING COORDINATED COLOR CLOCK FACE NUMBERS, HOUR AND MINUTE HANDS, AND HOUR AND MINUTE HAND LEARNING DISPLAYS

[76] Inventor: Katherine Martens, 3902 Manhattan College Pkwy., Apt. 4B, Riverdale, N.Y. 10471

[21] Appl. No.: 939,411

[22] Filed: Sep. 29, 1997

[51] Int. Cl.[6] .................................................. G09B 19/12
[52] U.S. Cl. .......................................... 434/304; 434/198
[58] Field of Search ..................................... 434/304, 198

[56] References Cited

U.S. PATENT DOCUMENTS

| | | | |
|---|---|---|---|
| 667,397 | 2/1901 | Jones | 44/198 |
| 2,837,838 | 6/1958 | Lewis | 434/308 |
| 3,508,350 | 4/1970 | Genin | 434/304 |
| 3,608,214 | 9/1971 | Rancati | 434/304 |
| 4,013,346 | 3/1977 | Ogaswara | 434/304 |
| 4,043,057 | 8/1977 | Gusmler | 434/198 |
| 4,368,046 | 1/1983 | Bermok | 434/304 |
| 4,731,025 | 3/1988 | Taylor | 434/304 |
| 4,920,033 | 4/1990 | Cress | 434/198 |
| 5,380,206 | 1/1995 | Asprey | 434/304 |
| 5,505,624 | 4/1996 | Novosel | 434/304 |

OTHER PUBLICATIONS

The Problem Deaf Child, by Ernest Tinsmoth & Katherine J. Martens, C. 1974, p. 45.

*Primary Examiner*—Paul J. Hirsch
*Attorney, Agent, or Firm*—Ware, Fressola, Van Der Sluys & Adolphson LLP

[57] ABSTRACT

The present invention is directed to a learning clock for assisting teachers to teach students how to tell time and learn the correspondence between the time of day according to a traditional clock face or "analog" and the time of day according to strictly numerals or "digital." The clock includes a traditional clock face having an hour hand and a minute hand which are manually rotatable about the clock face and numerals about the clock face for both the hours of the day and the minutes of the hour. The clock also includes a pair of disks for establishing a time of day using strictly numbers. The methods of establishing a time of day operate independent of each other, allowing for a student to match one method to the other.

5 Claims, 3 Drawing Sheets

LEARNING CLOCK FEATURING COORDINATED COLOR CLOCK FACE NUMBERS, HOUR AND MINUTE HANDS, AND HOUR AND MINUTE HAND LEARNING DISPLAYS

BACKGROUND OF THE INVENTION

1. Field of the Invention

The present invention is directed to educational devices. More particularly, the present invention is directed to a device for teaching children or those with learning disabilities to tell time.

2. Brief Description of the Related Art

It is well-known that teaching one to tell time is one of the more difficult concepts to instill upon young people. As such, the need for devices which can make such a task easier is great. Human beings are a very visual species and therefore any method for teaching which brings a visual component will more likely speed the learning process. Further, the use of multiple avenues which bring home the same idea will also decrease the time it typically takes one to learn a particular topic.

The difficulty with teaching a child to tell time relates to the concept of motion of the clock's hands and the corresponding numerals on the clock face. Further the concept of a "little" hand and a "big" hand and the corresponding hours and minutes can be difficult to grasp. Several devices have attempted to relate the two concepts by providing a teaching device which links the hands of a clock face with corresponding numerals and or words. Such a device is believed to assist the child in understanding the relationship between the clock face and the time of day. These devices operate such that as the hands on the clock face are rotated, the corresponding numerals or words necessarily change. Such a method prevents a child from thinking independently with regard determining correspondence between the hands of the clock and the numbers which represent the hour and minute of the day.

U.S. Pat. No. 4,015,346 to Ogasawara discloses a teaching device for learning the manner in which a clock indicates time. This device includes a clock face having the hours of the day disposed thereon and an hour and a minute hand. The device also includes means for displaying numerals which are representative of the hour and minute of the day. As the clock hands are rotated means associated with the device automatically rotate the numerals to the corresponding hour and minute of the day. This device does not allow for independent movement of the clock hands and the means for displaying numerals which would correspond to the time indicated by the clock hands.

U.S. Pat. No. 3,364,599 to Polsky discloses an educational device for teaching time. The device includes three disc elements arranged one on top of the other. The bottom two discs are rotatable relative to each other and the top disc. The discs include various indicators of the time of day, including a clock face, numerals corresponding the hours and minutes of the day and words which also correspond to hours and minutes of the day. As the discs are rotated the hands of the clock are directed to different times of the day. At the same time, numerals and words corresponding to the clock hands are automatically displayed. As such, this device does not allow for independent display of the clock hand and other manners of indicating a time of day. Further, this device does not allow for separately changing the time according to the clock hands and according to the numerals representing the time of day.

U.S. Pat. No. 3,203,115 to Friday discloses an educational clock. This device includes an element which serves as the clock face. The clock face is imprinted in a conventional manner and carries an hour and minute hand. The device also includes an hour dial and a minute dial. The hour hand and the minute hand are mechanically connected to the hour dial and minute dial, respectively, such that as each hand is rotated the associated dial also rotates. As such, this device does not allow for rotation of the clock hands without associated rotation of the means for displaying numeric representation of the time of day and vice versa.

While these known devices provide a system for displaying the hours of the day as shown on the face of a clock and corresponding numerals or words which represent the time of day, such is done automatically. These devices do not allow for independent display of a time of day on the clock face and by way of numeric display. Such a device prohibits a teacher from requesting a student display a numeric display which corresponds to a clock face display and vice versa. These devices have the further drawback that mechanically linking the clock face to the numeric display requires a complex system which makes the device difficult to manufacture and prone to break.

SUMMARY OF THE INVENTION

It is therefor an object of the present invention to provide a teaching device for teaching students to tell time.

It is a further object of the present invention to provide a teaching device for teaching students to tell time which provides both analog and digital displays.

It is still a further object of the present invention to provide a teaching device for teaching students to tell time wherein the analog and digital displays may be operated independently.

It is yet another object of the present invention to provide a teaching device for teaching students to tell time which provides a simple and easily manufactured device.

These and other objects of the present invention are achieved by providing a device which includes a main housing. The main housing has a simulated clock face located on an upper portion of the front of the housing. The clock face includes a pair of hands and two sets of numbers, one corresponding to the hours of the day and one corresponding to the minutes of the hour. The hands rotate about the clock face in order to indicate a particular time of day. The present invention also includes a pair of disk shaped elements which are coupled to a lower portion of the main housing, the disks being placed one next to the other such that one disk is associated with each side of the main housing. Each of the disks has a set of numbers about the outer periphery of the disk, one set corresponding the hours of the day and the other set corresponding to the minutes of the hour. The main housing has two through holes, one associated with each of the disks and which allows a single number on the periphery of the disk to be viewed from the front of the main housing. This arrangement allows a student or teacher to establish a particular time with the clock face and then establish the corresponding time using the disks and vice versa. In this manner a student can be given a problem, such as a particular time on the clock face and be asked to solve the problem by establishing the corresponding time on the disks.

Other objects and features of the invention will become apparent from consideration of the following description taken in connection with the accompanying drawings.

DESCRIPTION OF THE PREFERRED EMBODIMENT

Figure 1:
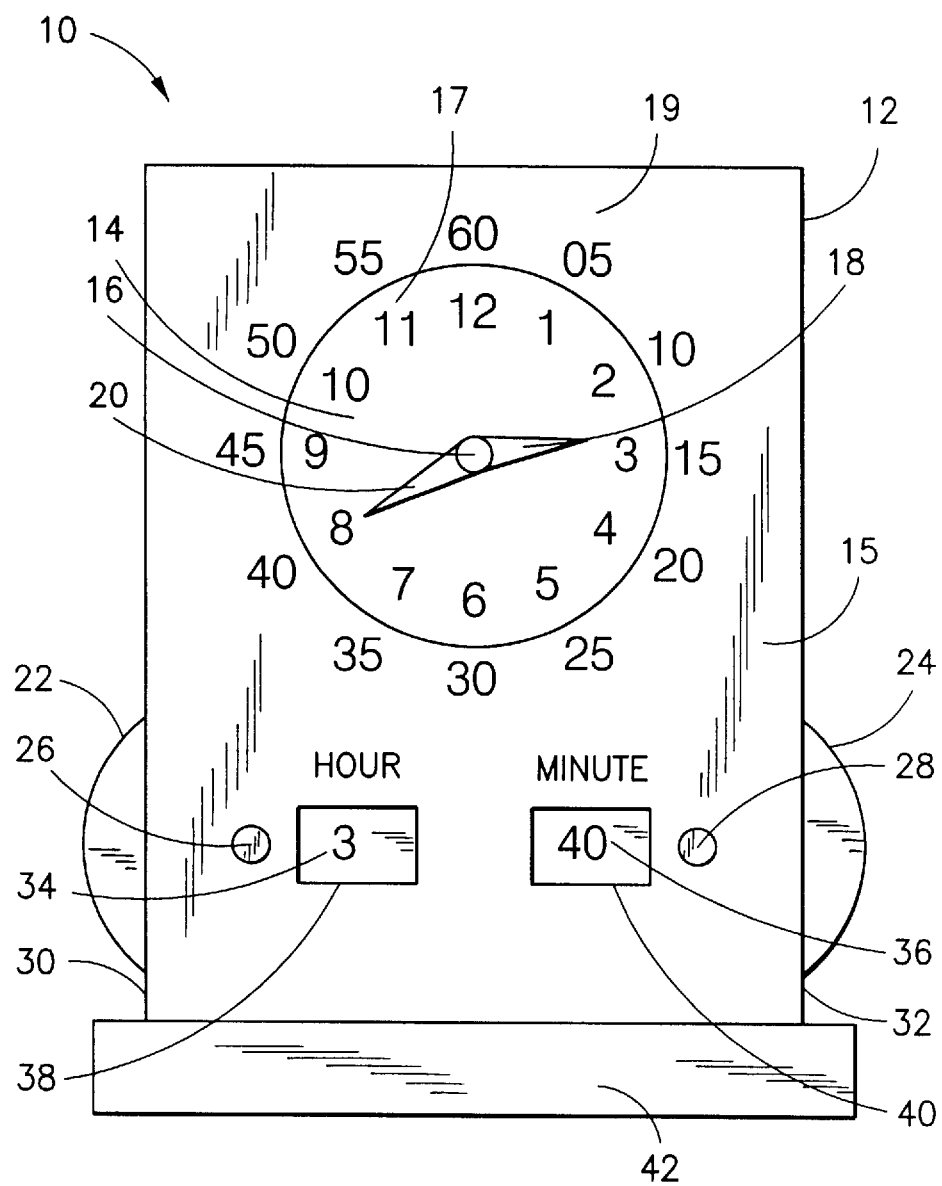
FIG. 1 is a front elevation view of the present invention.

In the accompanying figures there is illustrated a learning clock for assisting in the process of teaching students to tell time. The learning clock of the present invention is shown generally in FIGS. 1 and 2 at 10. The clock 10 comprises a main housing 12. The main housing 12 includes a clock face, shown generally at 14, placed on a front 15 of the main housing 12. The clock face 14 includes two sets of numbers. The first number set 17, placed about an inner periphery of the clock face 14, corresponds to the hours of the day and is set in a conventional manner. The second number set 19, place about an outer periphery of the clock face 14, corresponds to the minutes of the day and is set at five minute intervals.

A shaft 16 sits within the main housing 12 and extends therefrom at a position at the center of the clock face 14. The clock 10 further includes a pair of clock hands 18 and 20. Hand 18 represents an hour hand and is relatively shorter than hand 20, which represents a minute hand. Hands 18 and 20 are rotatably connected to shaft 16 in such which permits the hands to rotate about the clock face 14 yet remain stationary if the main housing 12 is placed in a vertical position.

The clock 10 further includes a pair of disks 22 and 24. The disks 22 and 24 are rotatably coupled to shafts 26 and 28, respectively. Shafts 26 and 28 are fixedly coupled to the main housing 12, such that at any given time a portion of disk 22 extends from a left side 30 of the main housing 12 allowing one to rotate the disk 22 and a portion of disk 24 extends from a right side 32 of the main housing 12 allowing one to rotate the disk 24. Disk 22 includes a third set of numbers 34 placed on a front side about the periphery thereof The third number set 34 corresponds to the hours of the day. Disk 24 includes a fourth set of numbers 36 placed on a front side about the periphery thereof. The fourth number set 36 corresponds to the minutes of the hour, at five minute intervals. The main housing 12 also includes a pair of openings 38 and 40 which extend through the main housing 12 providing a window to the disks 22 and 24, respectively. The first and second windows 38 and 40 are placed in a position centrally between the left and right sides 30 and 32 of the main housing 12. The first window 38 is positioned such that it allows a student facing the front 15 of the main housing 12 to view a single number of the third number set 34 when the disk 22 is correctly positioned. In the same manner, the second window 40 allows a student facing the front 15 of the main housing 12 to view a single number of the fourth number set 36 when the disk 24 is correctly positioned.

The clock 10 may also include a base 42 attached to the bottom 44 of the main housing 12. In the preferred embodiment the hour hand 18, the first number set 17, and the third number set 34 are all of the same color, for example red. Likewise, in the preferred embodiment, the minute hand 20, the second number set 19 and the third number set 36 are also of the same color, for example blue. This provides an additional means for the student to connect the clock face time, which appears in an "analog" form and the disk time, which appears in a "digital" form. In the preferred embodiment the clock is made from wood. However, any material which is easily formed into the desired shapes may be used.

Figure 2:
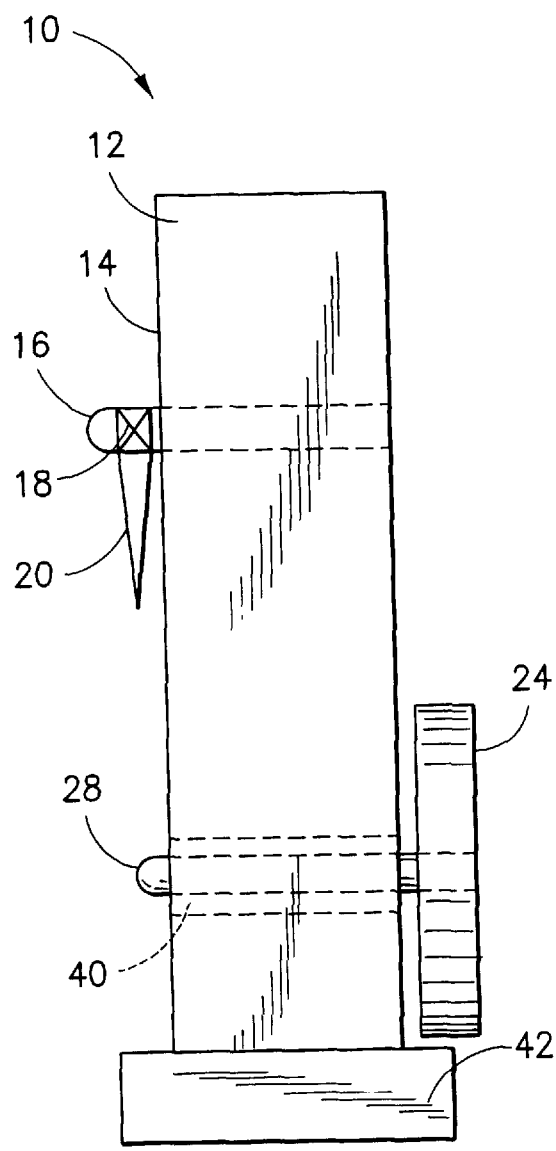
FIG. 2 is a side elevation view of the present invention.
Figure 3:
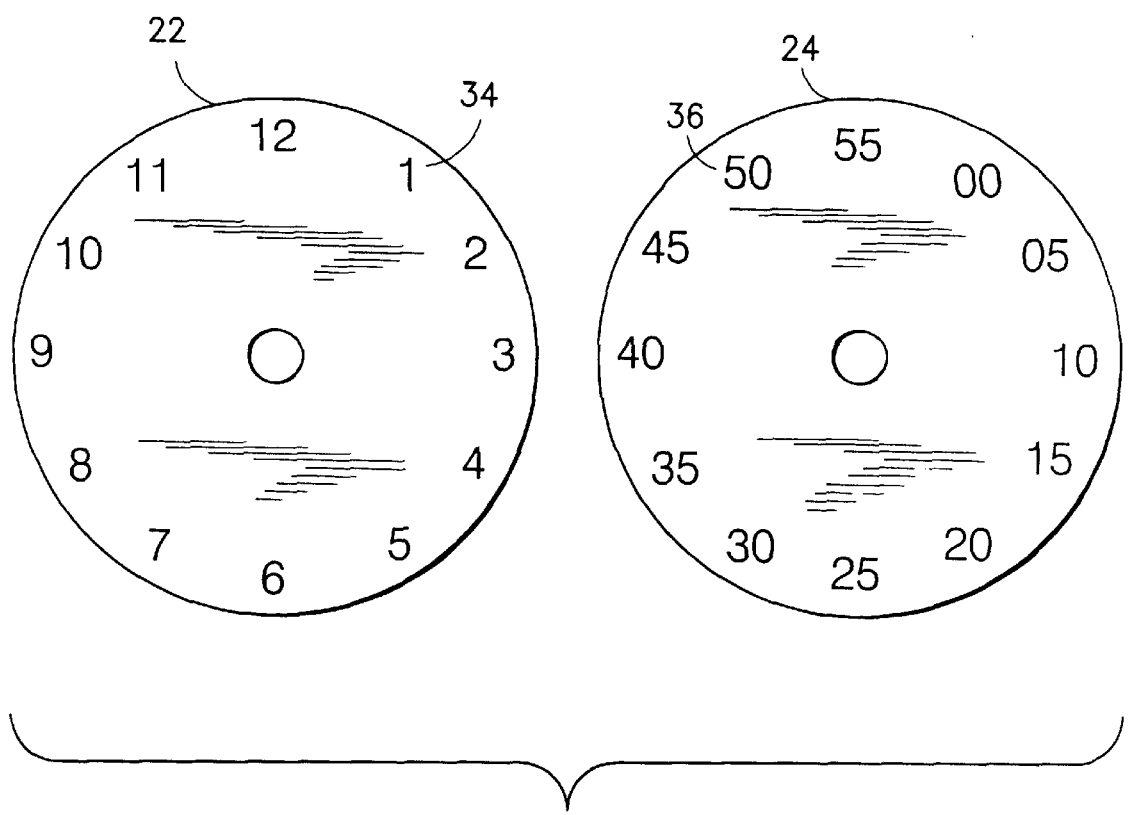
FIG. 3 is an enlarged elevation view of a pair of disks of the present invention.

The operation of the clock 10 is very simple. In one method, the hands 18 and 20 are placed to a particular time of day, for example three-forty, as shown in FIG. 1. In response to an assignment to establish the corresponding time in the "digital" format, as student would rotate the pair disks 22, 24 until the "3" appeared in the first window 38 and a "40" appeared in the second window 40. In the same manner, a time of day can be selected using the pair of disks 22, 24 and a student can be requested to establish the corresponding time using the hour and minute hands 18, 20. In this manner, a student and teacher may practice a query and response method of teaching and testing the student on the lessons of telling time.

While the preferred embodiment has been described and shown, it will be understood that these are not intended to limit the disclosure, but rather are intended to cover all modifications and alternate methods falling within the spirit and the scope of the invention as defined in the appended claims.

What is claimed is:

1. A color coordinated learning clock (10) for teaching a student, including a learning disabled student, how to tell time, comprising:

a main clock housing (12) having a clock face (14) with a first set of numbers (17) representing an hour in a day and with a second set of numbers (19) representing a minute in the day;

a pair of clock hands (18, 20) being coupled on rotatable shaft means (16), having an hour hand (18) for pointing to one of the first set of numbers (17) for indicating the hour in the day, and having a minute hand (20) for pointing to one of the second set of numbers (19) for indicating the minute in the day;

an hour hand learning display means (22, 26, 34, 38) having a first rotatable disk (22) and an hour displaying window (38) arranged with respect thereto, the first rotatable disk (22) being arranged on a first shaft (26) and having a corresponding first set of numbers (34) for representing a corresponding hour in the day, the first rotatable disk (22) for moving by the student to display one of the corresponding first set of numbers (34) in the hour displaying window (38) that corresponds to the hour in the day being pointed to by the hour hand (18); and a minute hand learning display means (24, 28, 36, 40) having a second rotatable disk (24) and a minute displaying window (40) arranged with respect thereto, the second rotatable disk (24) being arranged on a second shaft (28) and having a corresponding second set of numbers (36) for representing a corresponding minute in the day, the second rotatable disk (24) for moving by the student to display one of the corresponding second set of numbers (36) in the minute displaying window (40) that corresponds to the minute in the day being pointed to by the minute hand (20);

wherein the first set of numbers (17) representing the hour in the day and the hour hand (18) for pointing to the hour in the day are color coordinated in a first color with the corresponding first set of numbers (34) representing the corresponding hour in the day; and wherein the second set of numbers (19) representing the minute in the day and the minute hand (20) for pointing to the minute in the day are color coordinated in a second color with the corresponding second set of numbers (36) representing the corresponding minute in the day.

2. A color coordinated learning clock (10) according to claim 1, wherein the first shaft (26) is arranged on the main clock housing (12); and wherein the hour displaying window (38) is formed by an aperture in the main clock housing (12) below the clock face (14).

3. A color coordinated learning clock (10) according to claim 1, wherein the second shaft (28) is arranged on the main clock housing (12); and wherein the minute displaying window (40) is formed by an aperture in the main clock housing (12) below the clock face (14).

4. A color coordinated learning clock (10) according to claim 1, wherein the first shaft (26) is arranged on the main clock housing (12);

wherein the hour displaying window (38) is formed by an aperture in the main clock housing (12) below the clock face (14);

wherein the second shaft (28) is arranged on the main clock housing (12); and wherein the minute displaying window (40) is formed by an aperture in the main clock housing (12) below the clock face (14).

5. A color coordinated learning clock (10) for teaching a student, including a learning disabled student, how to tell time, comprising:

a main clock housing (12) having a clock face (14) with a first set of numbers (17) representing an hour in a day and with a second set of numbers (19) representing a minute in the day;

a pair of clock hands (18, 20) being coupled on rotatable shaft means (16), having an hour hand (18) for pointing to one of the first set of numbers (17) for indicating the hour in the day, and having a minute hand (20) for pointing to one of the second set of numbers (19) representing the minute in the day;

an hour hand learning display means (22, 34) having means (22) for moving a corresponding first set of numbers (34) for representing a corresponding hour in the day, the means (22) for moving by the student to display one of the corresponding first set of numbers (34) that corresponds to the hour in the day being pointed to by the hour hand (18); and a minute hand learning display means (24, 36) having means (24) for moving a corresponding second set of numbers (36) for representing a corresponding minute in the day, the means (24) for moving by the student to display one of the corresponding second set of numbers (36) that corresponds to the minute in the day being pointed to by the minute hand (20);

wherein the first set of numbers (17) representing the hour in the day and the hour hand (18) for pointing to the hour in the day, is color coordinated in a first color with the corresponding first set of numbers (34) representing the corresponding hour in the day; and wherein the second set of numbers (19) representing the minute in the day and the minute hand (20) for pointing to the minute in the day are color coordinated in a second color with the corresponding second set of numbers (36) representing the corresponding minute in the day.

* * * * *

UNITED STATES PATENT AND TRADEMARK OFFICE
CERTIFICATE OF CORRECTION

PATENT NO : 5,863,205
DATED : January 26, 1999
INVENTOR(S) : Katherine Martens

It is certified that error appears in the above-identified patent and that said Letters Patent is hereby corrected as shown below:

Title page, item [56]

Under References Cited, U.S. Patent Documents, Ogasawara, please delete "3/1977" and insert --4/1977--.

In column 3, line 36, after "thereof" please insert --.--.

In column 6, line 23, please delete "is" and insert --are--.

Signed and Sealed this

Fourth Day of January, 2000

Attest:

Attesting Officer

Acting Commissioner of Patents and Trademarks